United States Patent
Iizuka et al.

(10) Patent No.: US 10,407,517 B2
(45) Date of Patent: Sep. 10, 2019

(54) RUBBER COMPOSITION FOR TIRES AND PNEUMATIC TIRE

(71) Applicant: The Yokohama Rubber Co., LTD., Minato-ku, Tokyo (JP)

(72) Inventors: Yusuke Iizuka, Hiratsuka (JP); Hiroki Sugimoto, Hiratsuka (JP); Makoto Ashiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 244 days.

(21) Appl. No.: 15/507,216

(22) PCT Filed: Aug. 24, 2015

(86) PCT No.: PCT/JP2015/073719
§ 371 (c)(1),
(2) Date: Feb. 27, 2017

(87) PCT Pub. No.: WO2016/031769
PCT Pub. Date: Mar. 3, 2016

(65) Prior Publication Data
US 2017/0283519 A1  Oct. 5, 2017

(30) Foreign Application Priority Data
Aug. 27, 2014 (JP) .................. 2014-173310

(51) Int. Cl.
| | |
|---|---|
| *C08K 3/36* | (2006.01) |
| *C08C 19/30* | (2006.01) |
| *B60C 1/00* | (2006.01) |
| *C08K 5/098* | (2006.01) |
| *C08K 5/5419* | (2006.01) |
| *C08K 5/548* | (2006.01) |
| *C08C 19/34* | (2006.01) |
| *C08C 19/36* | (2006.01) |
| *C08C 19/38* | (2006.01) |
| *C08F 8/42* | (2006.01) |
| *C08F 297/04* | (2006.01) |
| *C08L 53/02* | (2006.01) |

(52) U.S. Cl.
CPC ............... *C08C 19/30* (2013.01); *B60C 1/00* (2013.01); *B60C 1/0016* (2013.01); *C08C 19/34* (2013.01); *C08C 19/36* (2013.01); *C08C 19/38* (2013.01); *C08F 8/42* (2013.01); *C08F 297/046* (2013.01); *C08K 3/36* (2013.01); *C08K 5/098* (2013.01); *C08K 5/548* (2013.01); *C08K 5/5419* (2013.01); *C08L 53/025* (2013.01); *Y02T 10/862* (2013.01)

(58) Field of Classification Search
CPC ........ C08G 19/34; C08G 19/36; C08G 19/38; C08G 19/30; C08K 3/36
See application file for complete search history.

(56) References Cited

U.S. PATENT DOCUMENTS

| | | | | |
|---|---|---|---|---|
| 6,127,472 | A * | 10/2000 | Kobayashi | C08K 3/04 524/492 |
| 2011/0152405 | A1* | 6/2011 | Thomasson | B60C 1/0016 523/155 |
| 2011/0294936 | A1 | 12/2011 | Sato | |
| 2013/0267646 | A1 | 10/2013 | Kameda et al. | |
| 2013/0331498 | A1* | 12/2013 | Miyazaki | B60C 1/0016 524/493 |
| 2015/0126643 | A1 | 5/2015 | Satou et al. | |
| 2015/0133600 | A1* | 5/2015 | Iizuka | B60C 1/00 524/573 |
| 2015/0148447 | A1* | 5/2015 | Takeda | B60C 1/0016 523/156 |
| 2016/0108210 | A1 | 4/2016 | Sato et al. | |

FOREIGN PATENT DOCUMENTS

| | | |
|---|---|---|
| JP | 2011-246640 | 12/2011 |
| JP | 2013-001795 | 1/2013 |
| JP | 2013-075986 | 4/2013 |
| JP | 2013-213179 | 10/2013 |
| WO | WO 2011/158509 | 12/2011 |
| WO | WO 2013/133432 | 9/2013 |
| WO | 2013/161876 | * 10/2013 |
| WO | 2014/050341 | * 4/2014 |
| WO | WO 2014/050341 | 4/2014 |
| WO | WO 2014/185495 | 11/2014 |

OTHER PUBLICATIONS

International Search Report for International Application No. PCT/JP2015/073719 dated Nov. 24, 2015, 4 pages, Japan.

* cited by examiner

*Primary Examiner* — Margaret G Moore
(74) *Attorney, Agent, or Firm* — Thorpe North & Western (57) ABSTRACT

A rubber composition for tires of the present technology contains a diene rubber, silica, a silane coupling agent, a fatty acid metal salt, and a predetermined alkyltrialkoxysilane; the diene rubber containing 60 mass % or greater of a modified conjugated diene rubber and 30 mass % or greater of a particular conjugated diene rubber which corresponds to a part or all of the modified conjugated diene rubber; an average glass transition temperature of the diene rubber being from −45 to −20° C.; the particular conjugated diene rubber being a conjugated diene rubber produced by a particular production method and having predetermined ranges of aromatic vinyl unit content, vinyl bond content, and weight average molecular weight.

8 Claims, 1 Drawing Sheet

RUBBER COMPOSITION FOR TIRES AND PNEUMATIC TIRE

TECHNICAL FIELD

The present technology relates to a rubber composition for tires and a pneumatic tire.

BACKGROUND ART

In recent years, reduction in rolling resistance of tires has been demanded from the perspective of fuel economy during travel of vehicles. From the perspective of safety, enhancement in wet performance (braking performance on wet road surfaces) has been also demanded. For these, a method of both achieving the low rolling resistance and the wet performance by blending silica to a rubber component constituting a tread portion of a tire has been known.

However, since silica has low affinity with rubber components and aggregability in silica is high, even when silica is simply added to a rubber component, silica is not dispersed, and there has been problems in that effect of reducing rolling resistance and/or effect of enhancing wet performance cannot be sufficiently achieved.

In response to these, International Patent Application Publication No. WO 2014/050341 discloses a conjugated diene rubber obtained by reacting a predetermined modifying agent with a conjugated diene-based polymer chain having an active terminal. International Patent Application Publication No. WO 2014/050341 describes that, by using the conjugated diene rubber, the affinity of silica and rubber is made excellent and the low heat build-up (low rolling resistance) and wet grip performance of tires can be enhanced.

When the inventors of the present technology studied the rubber composition including the conjugated diene rubber described in International Patent Application Publication No. WO 2014/050341, the inventors found that, depending on the compounded amount of the conjugated diene rubber and/or additives such as silica, the low rolling resistance and/or the wet grip performance of the produced tire may be poor, and also the steering stability may be poor.

SUMMARY

The present technology provides a rubber composition for tires exhibiting excellent wet performance, excellent low rolling resistance, and excellent steering stability, when the rubber composition is formed into a tire, and a pneumatic tire including the rubber composition for tires.

By blending a specific amount of predetermined conjugated diene rubber and blending specific amounts of silica, a silane coupling agent, a fatty acid metal salt, and a predetermined alkyltrialkoxysilane, excellent wet performance, excellent low rolling resistance, and excellent steering stability can be achieved when a tire is produced.

[1] A rubber composition for tires containing a diene rubber, silica, a silane coupling agent, a fatty acid metal salt, and an alkyltrialkoxysilane represented by Formula (I);

the diene rubber containing 60 mass % or greater of a modified conjugated diene rubber and 30 mass % or greater of a particular conjugated diene rubber which corresponds to a part or all of the modified conjugated diene rubber;

an average glass transition temperature of the diene rubber being from −45 to −20° C.;

a content of the silica being from 60 to 180 parts by mass per 100 parts by mass of the diene rubber;

a content of the silane coupling agent being from 4 to 20 parts by mass relative to the content of the silica;

a content of the fatty acid metal salt being from 2 to 8 mass % relative to the content of the silica;

a content of the alkyltrialkoxysilane being from 0.1 to 20 mass % relative to the content of the silica;

wherein, $R^{11}$ represents an alkyl group having from 1 to 20 carbons, and $R^{12}$ each independently represents a methyl group or an ethyl group;

the particular conjugated diene rubber being a conjugated diene rubber produced by a method of producing a conjugated diene rubber, the method including steps A, B, and C below in this order;

the particular conjugated diene rubber having an aromatic vinyl unit content of 38 to 48 mass %, a vinyl bond content of 20 to 35 mass %, and a weight average molecular weight of 500000 to 800000;

Step A: a step of forming a polymer block A having an active terminal, the polymer block A having an isoprene unit content of 80 to 95 mass %, an aromatic vinyl unit content of 5 to 20 mass %, and a weight average molecular weight of 500 to 15000, by polymerizing a monomer mixture containing isoprene and an aromatic vinyl;

Step B: a step of obtaining a conjugated diene-based polymer chain having an active terminal, the conjugated diene-based polymer chain having the polymer block A and a polymer block B, by forming the polymer block B having an active terminal by mixing the polymer block A with a monomer mixture containing 1,3-butadiene and an aromatic vinyl to continue polymerization reaction to form the polymer block B in series with the polymer block A;

Step C: a step of reacting a polyorganosiloxane represented by Formula (1) with the active terminal of the conjugated diene-based polymer chain;

Formula (1)

wherein, $R_1$ to $R_8$ are the same or different and are each an alkyl group having from 1 to 6 carbons or an aryl group having from 6 to 12 carbons; $X_1$ and $X_4$ are the same or different and are groups selected from the group consisting of alkyl groups having from 1 to 6 carbons, aryl groups having from 6 to 12 carbons, alkoxy groups having from 1 to 5 carbons, and groups having an epoxy group and from 4 to 12 carbons; $X_2$ is an alkoxy group having from 1 to 5 carbons or a group having an epoxy group and from 4 to 12 carbons, and a plurality of the $X_2$ moieties are the same or different; $X_3$ is a group having from 2 to 20 alkylene glycol repeating units, and when a plurality of the $X_3$ moieties exists, the $X_3$ moieties are the same or different; m is an integer of 3 to 200, n is an integer of 0 to 200, and k is an integer of 0 to 200.

[2] The rubber composition for tires according to [1], further including an aromatic modified terpene resin having a softening point of 100 to 150° C., a content of the aromatic modified terpene resin being from 1 to 50 parts by mass per 100 parts by mass of the diene rubber.

[3] The rubber composition for tires according to [1] or [2], where a CTAB (cetyltrimethylammonium bromide) adsorption specific surface area of the silica is 180 m²/g or greater.

[4] The rubber composition for tires according to [1] or [2], where, in the silica, a silica (X) having a CTAB adsorption specific surface area of 144 to 176 m²/g and a silica (Y) having a CTAB adsorption specific surface area of 180 to 220 m²/g are used in combination, and the mass ratio (X:Y) of the silica (X) to the silica (Y) is preferably from 4:1 to 1:3.

[5] A pneumatic tire having the rubber composition for tires described in any one of [1] to [4] in a cap tread.

As described below, according to the present technology, a rubber composition for tires exhibiting excellent wet performance, excellent low rolling resistance, and excellent steering stability, when a tire is produced, and a pneumatic tire including the rubber composition for tires can be provided.

Note that, hereinafter, achieving excellent wet performance when a tire is produced is simply abbreviated as "achieving excellent wet performance", achieving excellent low rolling resistance when a tire is produced is simply abbreviated as "achieving excellent low rolling resistance", and similarly, achieving excellent steering stability when a tire is produced is simply abbreviated as "achieving excellent steering stability".

DETAILED DESCRIPTION

Hereinafter, a rubber composition for tires of the present technology and a pneumatic tire including the rubber composition for tires of the present technology will be described.

In this specification, a numerical range represented using "(from) . . . to . . . " refers to a range including a numerical values preceding "to" as a lower limit value and a numerical value following "to" as an upper limit value, respectively.
Rubber Composition for Tires The rubber composition for tires of the present technology (hereinafter, simply abbreviated as "rubber composition of the present technology") contains a diene rubber, silica, a silane coupling agent, a fatty acid metal salt, and an alkyltrialkoxysilane represented by Formula (I) described below.

Note that the diene rubber is a diene rubber containing 60 mass % or greater of a modified conjugated diene rubber and 30 mass % or greater of a particular conjugated diene rubber which corresponds to a part or all of the modified conjugated diene rubber. Furthermore, the average glass transition temperature of the diene rubber is from −45 to −20° C.

Furthermore, the particular conjugated diene rubber is a conjugated diene rubber produced by a method of producing a conjugated diene rubber, the method including steps A, B, and C described below in this order. The conjugated diene rubber has an aromatic vinyl unit content of 38 to 48 mass %, a vinyl bond content of 20 to 35 mass %, and a weight average molecular weight of 500000 to 800000.

Furthermore, the content of the silica is from 60 to 180 parts by mass per 100 parts by mass of the diene rubber.

Similarly, the content of the silane coupling agent is from 4 to 20 mass % relative to the content of the silica.

Similarly, the content of the fatty acid metal salt is from 2 to 8 mass % relative to the content of the silica.

Similarly, the content of the alkyltrialkoxysilane is from 0.1 to 20 mass % relative to the content of the silica.

Since the rubber composition of the present technology has such a configuration, all the wet performance, low rolling resistance, and steering stability become excellent when the rubber composition is formed into a tire. Although the reason for this is unknown, the reason is presumed to be as follows.

It is known that characteristics such as low rolling resistance are enhanced by blending silica, an alkoxysilane, a silane coupling agent, and the like; however, it is also known that processability or the like is deteriorated due to aggregation since the silica tends to aggregate.

On the other hand, in the present technology, it is conceived that, by using a fatty acid metal salt together with a diene rubber containing 60 mass % or greater of a modified conjugated diene rubber and 30 mass % or greater of a particular conjugated diene rubber which corresponds to a part or all of the modified conjugated diene rubber, such aggregation can be suppressed even when the content of the silica is increased, and as a result, the wet performance, low rolling resistance, and steering stability are all made excellent.

Each of the components contained in the rubber composition of the present technology will be described in detail below.
Diene Rubber The diene rubber contained in the rubber composition of the present technology contains 60 mass % or greater of a modified conjugated diene rubber and 30 mass % or greater of a particular conjugated diene rubber which corresponds to a part or all of the modified conjugated diene rubber.

Note that the modified conjugated diene rubber is a conjugated diene rubber that is modified with a functional group having at least one type of atom selected from the group consisting of a nitrogen atom, an oxygen atom, and a silicon atom. Preferred examples of the modified conjugated diene rubber include functional group-modified conjugated diene rubbers having at least one type of functional group selected from the group consisting of amino groups, hydroxy groups, epoxy groups, carbonyl groups, alkoxysilyl groups, silanol groups, and siloxane groups represented by the general formula (1): —SiR$^A$R$^B$—O— (in the formula, R$^A$ and R$^B$ are each —CH$_3$ or —CH$_2$V; V is an organic group).

In the present technology, at least a part of the modified conjugated diene rubber is a particular conjugated diene rubber described below, and all of the modified diene rubber, which is contained at a proportion of 60 mass % or greater in the diene rubber, may be the particular conjugated diene rubber described below.

Furthermore, the content of the modified conjugated diene rubber in the diene rubber (including the content of the particular conjugated diene rubber described below) is preferably 80 mass % or greater, and is more preferably from 80 to 90 mass %.
Particular Conjugated Diene Rubber As described above, the particular conjugated diene rubber is a conjugated diene rubber produced by a method of producing a conjugated diene rubber, the method including steps A, B, and C described below in this order. The conjugated diene rubber has an aromatic vinyl unit content of 38 to 48 mass %, a vinyl bond content of 20 to 35 mass %, and a weight average molecular weight of 500000 to 800000.

Step A: a step of forming a polymer block A having an active terminal, the polymer block A having an isoprene unit content of 80 to 95 mass %, an aromatic vinyl unit content of 5 to 20 mass %, and a weight average molecular weight of 500 to 15000, by polymerizing a monomer mixture containing isoprene and an aromatic vinyl.

Step B: a step of obtaining a conjugated diene-based polymer chain having an active terminal, the conjugated diene-based polymer chain having the polymer block A and a polymer block B, by forming the polymer block B having an active terminal by mixing the polymer block A with a monomer mixture containing 1,3-butadiene and an aromatic vinyl to continue polymerization reaction to form the polymer block B in series with the polymer block A.

Step C: a step of reacting a polyorganosiloxane represented by Formula (1) below with the active terminal of the conjugated diene-based polymer chain.

Each of the steps will be described in detail below.
Step A

In Step A, a polymer block A having an active terminal and having an isoprene unit content of 80 to 95 mass %, an aromatic vinyl unit content of 5 to 20 mass %, and a weight average molecular weight of 500 to 15000, is formed by polymerizing a monomer mixture containing isoprene and an aromatic vinyl.

The monomer mixture may only contain isoprene and an aromatic vinyl, and may contain another monomer besides the isoprene and the aromatic vinyl.

The aromatic vinyl is not particularly limited; however, examples thereof include styrene, α-methylstyrene, 2-methyl styrene, 3-methyl styrene, 4-methyl styrene, 2-ethylstyrene, 3-ethyl styrene, 4-ethyl styrene, 2,4-diisopropylstyrene, 2,4-dimethyl styrene, 4-t-butylstyrene, 5-t-butyl-2-methylstyrene, vinylnaphthalene, dimethylaminomethylstyrene, and dimethylaminoethylstyrene. Among these, styrene is preferred. A single aromatic vinyl may be used alone or a combination of two or more types of these aromatic vinyls may be used.

Examples of the monomer except the isoprene and the aromatic vinyl include conjugated diene except isoprene, such as 1,3-butadiene, 2,3-dimethyl-1,3-butadiene, 2-chloro-1,3-butadiene, 1,3-pentadiene, and 1,3-hexadiene; α- and β-unsaturated nitriles, such as acrylonitrile and methacrylonitrile; unsaturated carboxylic acids or acid anhydrides, such as acrylic acid, methacrylic acid, and maleic anhydride; unsaturated carboxylates, such as methylmethacrylate, ethylacrylate, and butylacrylate; and non-conjugated dienes, such as 1,5-hexadiene, 1,6-heptadiene, 1,7-octadiene, dicyclopentadiene, and 5-ethylidene-2-norbornene. Among these, 1,3-butadiene is preferred. A single type of these may be used alone or a combination of two or more types of these may be used.

The monomer mixture described above is preferably polymerized in an inert solvent.

The inert solvent is not particularly limited as long as the inert solvent is an inert solvent typically used in solution polymerization and does not hinder the polymerization reaction. Specific examples thereof include chain aliphatic hydrocarbons, such as butane, pentane, hexane, heptane, and 2-butene; alicyclic hydrocarbons, such as cyclopentane, cyclohexane, and cyclohexene; aromatic hydrocarbons, such as benzene, toluene, and xylene. The used amount of the inert solvent is, for example, an amount such that the monomer mixture concentration is from 1 to 80 mass %, and preferably from 10 to 50 mass %.

The monomer mixture described above is preferably polymerized by a polymerization initiator.

The polymerization initiator is not particularly limited as long as the polymerization initiator can polymerize the monomer mixture containing isoprene and an aromatic vinyl and can form a polymer chain having an active terminal. As the specific examples thereof, an organoalkali metal compound and organoalkaline earth metal compound as well as a polymerization initiator having a lanthanide series metal compound or the like as a primary catalyst is preferably used. Examples of the organoalkali metal compound include organomonolithium compounds, such as n-butyllithium, sec-butyllithium, t-butyllithium, hexyllithium, phenyllithium, and stilbene lithium; organopolylithium compounds, such as dilithiomethane, 1,4-dilithiobutane, 1,4-dilithio-2-ethylcyclohexane, 1,3,5-trilithiobenzene, and 1,3,5-tris(lithiomethyl)benzene; organosodium compounds, such as sodium naphthalene; and organopotassium compounds, such as potassium naphthalene. Examples of the organoalkaline earth metal compound include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, and diketylbarium. Examples of the polymerization initiator having a lanthanide series metal compound as a primary catalyst include polymerization initiators containing a primary catalyst of a lanthanide series metal salt containing a lanthanide series metal such as lanthanum, cerium, praseodymium, neodymium, samarium, and gadolinium, and a carboxylic acid or phosphorus-containing organic acid, together with a co-catalyst such as an alkylaluminum compound, organoaluminum hydride compound, or organoaluminum halide compound. Among these polymerization initiators, an organomonolithium compound is preferably used, and n-butyllithium is more preferably used. Furthermore, the organoalkali metal compound may be used as an organoalkali metal amide compound after being subjected to a reaction with a secondary amine, such as dibutylamine, dihexylamine, dibenzylamine, pyrrolidine, hexamethyleneimine, and heptamethyleneimine. A single polymerization initiator may be used alone or a combination of two or more polymerization initiators may be used.

The used amount of the polymerization initiator may be selected depending on the targeted molecular weight, but the used amount is preferably from 4 to 250 mmol, more preferably from 6 to 200 mmol, and particularly preferably from 10 to 70 mmol, per 100 g of the monomer mixture.

The polymerization temperature at which the monomer mixture is polymerized is, for example, in a range from −80 to +150° C., preferably from 0 to 100° C., and more preferably from 20 to 90° C.

The polymerization mode may be some modes such as batch mode or continuous mode. The bonding type may be a variety of bonding types such as block, tapered, or random.

Examples of the method of adjusting the 1,4-bond content in the isoprene unit in the polymer block A include a method in which a polar compound is added in an inert solvent during the polymerization and the added amount thereof is adjusted. Examples of the polar compound include ether compounds, such as dibutyl ether, tetrahydrofuran, and 2,2-di(tetrahydrofuryl)propane; tertiary amines, such as tetramethylethylenediamine; alkali metal alkoxides; and phosphine compounds. In particular, ether compounds and tertiary amines are preferred. Among these, those capable of forming a chelate structure with the metal of the polymerization initiator are more preferred, and 2,2-di(tetrahydrofuryl)propane and tetramethylethylenediamine are particularly preferred.

The used amount of the polar compound may be selected depending on the targeted 1,4-bond content, and is preferably from 0.01 to 30 mol, and more preferably from 0.05 to 10 mol, per 1 mol of the polymerization initiator. When the used amount of polar compound is within the range described above, it is easy to adjust the 1,4-bond content in the isoprene unit, and problems due to deactivation of the polymerization initiator are less likely to occur.

The 1,4-bond content in the isoprene unit in the polymer block A is preferably from 10 to 95 mass %, and more preferably from 20 to 95 mass %.

Note that, in the present specification, "1,4-bond content in the isoprene unit" indicates the proportion (mass %) of the isoprene unit with a 1,4-bond relative to the total amount of the isoprene unit contained in the polymer block A.

The weight average molecular weight (Mw) of the polymer block A measured by gel permeation chromatography (GPC) based on calibration with polystyrene is from 500 to 15000. In particular, the weight average molecular weight (Mw) is preferably from 1000 to 12000, and more preferably from 1500 to 10000.

When the weight average molecular weight of the polymer block A is less than 500, desired low heat build-up and wet performance are less likely to be exhibited.

When the weight average molecular weight of the polymer block A is greater than 15000, the desired balance of viscoelastic characteristics which serves as an indicator of low rolling and wet performance may be deteriorated.

The molecular weight distribution expressed by the ratio (Mw/Mn) of the weight average molecular weight (Mw) to the number average molecular weight (Mn) of the polymer block A is preferably from 1.0 to 1.5, and more preferably from 1.0 to 1.3. When the value (Mw/Mn) of the molecular weight distribution of the polymer block A is within the range described above, the production of the particular conjugated diene rubber is more facilitated. Note that both Mw and Mn are values measured by GPC based on calibration with polystyrene.

The isoprene unit content of the polymer block A is from 80 to 95 mass %, and preferably from 85 to 95 mass %.

The aromatic vinyl content of the polymer block A is from 5 to 20 mass %, preferably from 5 to 15 mass %, and more preferably from 5 to 13 mass %.

The content of the monomer unit except the isoprene and the aromatic vinyl in the polymer block A is preferably 15 mass % or less, more preferably 10 mass % or less, and even more preferably 6 mass % or less.

Step B

In Step B, a conjugated diene-based polymer chain having an active terminal and having the polymer block A and a polymer block B is obtained by forming the polymer block B having an active terminal by mixing the polymer block A formed in Step A described above with a monomer mixture containing 1,3-butadiene and an aromatic vinyl to continue polymerization reaction to form the polymer block B in series with the polymer block A.

Specific examples and preferred aspects of the aromatic vinyl are as described above.

The monomer mixture described above is preferably polymerized in an inert solvent.

The definition, specific examples, and preferred aspects of the inert solvent are as described above.

The used amount of the polymer block A having an active terminal during the formation of the polymer block B may be selected depending on the targeted molecular weight and is, for example, from 0.1 to 5 mmol, preferably from 0.15 to 2 mmol, and more preferably from 0.2 to 1.5 mmol, per 100 g of the monomer mixture containing 1,3-butadiene and an aromatic vinyl.

The method of mixing the polymer block A with the monomer mixture containing 1,3-butadiene and an aromatic vinyl is not particularly limited. The polymer block A having an active terminal may be added to a solution of the monomer mixture containing 1,3-butadiene and an aromatic vinyl, or the monomer mixture containing 1,3-butadiene and an aromatic vinyl may be added to a solution of the polymer block A having an active terminal. From the perspective of controlling the polymerization, adding the polymer block A having an active terminal to a solution of the monomer mixture containing 1,3-butadiene and an aromatic vinyl is preferred.

When the monomer mixture containing 1,3-butadiene and an aromatic vinyl is polymerized, the polymerization temperature is, for example, in a range from −80 to +150° C., preferably from 0 to 100° C., and more preferably from 20 to 90° C. The polymerization mode may be any modes such as batch mode or continuous mode. In particular, batch mode is preferred.

The bonding type of each monomer of the polymer block B may be a variety of bonding types such as block, tapered, or random. Among these, random bonding is preferred. When the bonding type between the 1,3-butadiene and the aromatic vinyl is random, it is preferred that the 1,3-butadiene and the aromatic vinyl are supplied and polymerized continuously or intermittently to the polymerization system so that the ratio of the aromatic vinyl to the total amount of the 1,3-butadiene and the aromatic vinyl is not too high in the polymerization system.

The 1,3-butadiene unit content of the polymer block B is not particularly limited; however, the content is preferably from 55 to 95 mass %, and more preferably from 55 to 90 mass %.

The aromatic vinyl unit content of the polymer block B is not particularly limited; however, the content is preferably from 5 to 45 mass %, and more preferably from 10 to 45 mass %.

The polymer block B may further contain another monomer unit besides the 1,3-butadiene unit and the aromatic vinyl unit. Examples of another monomer used to constitute such another monomer unit include those exemplified as "examples except the aromatic vinyl of the monomer, excluding the isoprene" described above except the 1,3-butadiene; and isoprene.

The content of such another monomer unit of the polymer block B is preferably 50 mass % or less, more preferably 40 mass % or less, and even more preferably 35 mass % or less.

To adjust the vinyl bond content in the 1,3-butadiene unit of the polymer block B, a polar compound is preferably added to an inert solvent in the polymerization. However, a polar compound does not have to be added again if a polar compound has already been added to the inert solvent in an amount sufficient to adjust the vinyl bond content in the 1,3-butadiene unit in the polymer block B when the polymer block A is prepared. Specific examples of the polar compound used to adjust the vinyl bond content are the same as the polar compounds used in the formation of the polymer block A described above. The used amount of polar compound should be determined according to the targeted vinyl bond content, but is preferably from 0.01 to 100 mol, and more preferably from 0.1 to 30 mol, relative to 1 mol of the polymerization initiator. When the used amount of the polar compound is within this range, it is easy to adjust the vinyl bond content in the 1,3-butadiene unit, and problems due to deactivation of the polymerization initiator are less likely to occur.

The vinyl bond content in the 1,3-butadiene unit in the polymer block B is preferably from 10 to 90 mass %, more preferably from 20 to 80 mass %, and particularly preferably from 25 to 70 mass %.

By Steps A and B, a conjugated diene-based polymer chain having an active terminal and having the polymer block A and the polymer block B can be obtained.

The conjugated diene-based polymer chain having an active terminal is preferably composed of the polymer block A-polymer block B and the terminal of the polymer block B is preferably an active terminal from the perspective of productivity. However, the conjugated diene-based polymer chain may contain a plurality of the polymer block A, or contain another polymer block. Examples thereof include conjugated diene-based polymer chains having an active terminal, such as polymer block A-polymer block B-polymer block A and blocks formed only from polymer block A-polymer block B-isoprene. When the block formed only from isoprene is formed on the active terminal side of the conjugated diene-based polymer chain, the used amount of isoprene is preferably from 10 to 100 mol, more preferably from 15 to 70 mol, and particularly preferably from 20 to 35 mol, per 1 mol of the polymerization initiator used in the first polymerization reaction.

The mass ratio of the polymer block A to the polymer block B, (mass of the polymer block A)/(mass of the polymer block B), in the conjugated diene-based polymer chain having an active terminal (in the case where a plurality of the polymer blocks A and B are present, based on each of the total mass) is preferably from 0.001 to 0.1, more preferably from 0.003 to 0.07, and particularly preferably from 0.005 to 0.05.

The molecular weight distribution expressed as the ratio (Mw/Mn) of the weight average molecular weight (Mw) to the number average molecular weight (Mn) of the conjugated diene-based polymer chain having an active terminal is preferably from 1.0 to 3.0, more preferably from 1.0 to 2.5, and particularly preferably from 1.0 to 2.2. When the value (Mw/Mn) of the molecular weight distribution of the conjugated diene-based polymer chain having an active terminal is within the range described above, production of the particular conjugated diene rubber is facilitated. Note that both Mw and Mn are values measured by GPC based on calibration with polystyrene.

In the conjugated diene-based polymer chain having an active terminal, the total content of the isoprene unit and the 1,3-butadiene unit of 50 to 99.995 mass % and the content of the aromatic vinyl unit of 0.005 to 50 mass % are preferred, the total content of the isoprene unit and the 1,3-butadiene unit of 55 to 95 mass % and the content of the aromatic vinyl unit of 5 to 45 mass % are more preferred, and the total content of the isoprene unit and the 1,3-butadiene unit of 55 to 90 mass % and the content of the aromatic vinyl unit of 10 to 45 mass % are particularly preferred. Furthermore, the vinyl bond content in the isoprene unit and the 1,3-butadiene unit in the conjugated diene-based polymer chain having an active terminal are similar to the vinyl bond content in the 1,3-butadiene unit in the polymer block B described above.

Step C

Step C is a step of reacting a polyorganosiloxane represented by Formula (1) below with the active terminal of the conjugated diene-based polymer chain obtained in Step B.

Formula (1)

In Formula (1) above, $R_1$ to $R_8$ are the same or different and are each an alkyl group having from 1 to 6 carbons or an aryl group having from 6 to 12 carbons. $X_1$ and $X_4$ are the same or different and are groups selected from the group consisting of alkyl groups having from 1 to 6 carbons, aryl groups having from 6 to 12 carbons, alkoxy groups having from 1 to 5 carbons, and groups having an epoxy group and from 4 to 12 carbons. $X_2$ is an alkoxy group having from 1 to 5 carbons or a group having an epoxy group and from 4 to 12 carbons, and a plurality of the $X_2$ moieties are the same or different. $X_3$ is a group having from 2 to 20 alkylene glycol repeating units, and when a plurality of the $X_3$ moieties exists, the $X_3$ moieties are the same or different. m is an integer of 3 to 200, n is an integer of 0 to 200, and k is an integer of 0 to 200.

Examples of the alkyl groups having from 1 to 6 carbons represented by $R_1$ to $R_8$, $X_1$, and $X_4$ in the polyorganosiloxane represented by Formula (1) above include a methyl group, an ethyl group, an n-propyl group, an isopropyl group, a butyl group, a pentyl group, a hexyl group, and a cyclohexyl group. Examples of the aryl groups having from 6 to 12 carbons include a phenyl group, and a methylphenyl group. Among these, a methyl group and an ethyl group are preferred from the perspective of production of the polyorganosiloxane itself.

Examples of the alkoxyl groups having from 1 to 5 carbons represented by $X_1$, $X_2$, and $X_4$ in the polyorganosiloxane represented by Formula (1) above include a methoxy group, an ethoxy group, a propoxy group, an isopropoxy group, and a butoxy group. Among these, a methoxy group and an ethoxy group are preferred from the perspective of reactivity with the active terminal of the conjugated diene-based polymer chain.

Examples of the epoxy group-containing groups having from 4 to 12 carbons represented by $X_1$, $X_2$, and $X_4$ in the polyorganosiloxane represented by Formula (1) above include groups represented by Formula (2) below.

$$*-Z_1-Z_2-E$$

Formula (2)

In Formula (2) above, $Z_1$ is an alkyl arylene group or alkylene group having from 1 to 10 carbons; $Z_2$ is a methylene group, a sulfur atom, or an oxygen atom; and E is an epoxy group-containing hydrocarbon group having from 2 to 10 carbons. In Formula (2) above, * indicates a bond position.

In the groups represented by Formula (2) above, preferably, $Z_2$ is an oxygen atom; more preferably, $Z_2$ is an oxygen atom and E is a glycidyl group; and particularly preferably, $Z_1$ is an alkylene group having from 1 to 3 carbons, $Z_2$ is an oxygen atom, and E is a glycidyl group.

In the polyorganosiloxane represented by Formula (1) above, $X_1$ and $X_4$ are preferably epoxy group-containing groups having from 4 to 12 carbons or alkyl groups having from 1 to 6 carbons among the above, and $X_2$ is preferably an epoxy group-containing group having from 4 to 12 carbons among the above. More preferably, $X_1$ and $X_4$ are alkyl groups having from 1 to 6 carbons and $X_2$ is an epoxy group-containing group having from 4 to 12 carbons.

In the polyorganosiloxane represented by Formula (1) above, a group represented by Formula (3) below is preferred as $X_3$, that is, a group containing from 2 to 20 alkylene glycol repeating units.

Formula (3)

In Formula (3) above, t is an integer of 2 to 20, P is an alkyl arylene group or an alkylene group having from 2 to 10 carbons, R is a hydrogen atom or a methyl group, and Q is an aryloxy group or an alkoxy group having from 1 to 10 carbons. In Formula (3) above, * indicates a bond position. Among these, preferably, t is an integer of 2 to 8, P is an alkylene group having 3 carbons, R is a hydrogen atom, and Q is a methoxy group.

In the polyorganosiloxane represented by Formula (1) above, m is an integer of 3 to 200, preferably an integer of 20 to 150, and more preferably an integer of 30 to 120. Since m is an integer of 3 or greater, the particular conjugated diene rubber has high affinity with silica, and as a result, a tire formed from the rubber composition of the present technology exhibits excellent low heat build-up. Furthermore, since m is an integer of 200 or less, production of the polyorganosiloxane is facilitated and the viscosity of the rubber composition of the present technology becomes lower.

In the polyorganosiloxane represented by Formula (1) above, n is an integer of 0 to 200, preferably an integer of 0 to 150, and more preferably an integer of 0 to 120. Furthermore, in the polyorganosiloxane represented by Formula (1) above, k is an integer of 0 to 200, preferably an integer of 0 to 150, and more preferably an integer of 0 to 130.

In the polyorganosiloxane represented by Formula (1) above, the total number of m, n, and k is preferably from 3 to 400, more preferably from 20 to 300, and particularly preferably from 30 to 250.

Note that, in the polyorganosiloxane represented by Formula (1) above, when the epoxy group in the polyorganosiloxane is reacted with an active terminal of the conjugated diene-based polymer chain, it is conceived that bonding of the carbon atom, located at the part where the epoxy group ring has been opened, to the active terminal of the conjugated diene-based polymer chain is formed due to the ring-opening of at least a part of epoxy group in the polyorganosiloxane. Furthermore, when the alkoxy group in the polyorganosiloxane is reacted with an active terminal of the conjugated diene-based polymer chain, it is conceived that, by eliminating at least a part of the alkoxy group in the polyorganosiloxane, bonding of the silicon atom, which was bonded to the eliminated alkoxy group, in the polyorganosiloxane to the active terminal of the conjugated diene-based polymer chain is formed.

The used amount of the polyorganosiloxane (hereinafter, also referred to as "modifying agent") is an amount such that the ratio of the total number of moles of the epoxy group and the alkoxy group in the modifying agent to 1 mol of the polymerization initiator used in the polymerization is preferably in a range from 0.1 to 1, more preferably in a range from 0.2 to 0.9, and even more preferably in a range from 0.3 to 0.8.

In the method of producing the conjugated diene rubber, a part of the active terminals of the conjugated diene-based polymer chain may be inactivated in the range that does not inhibit the effect of the present technology, by adding a polymerization terminator, a polymerization terminal modifying agent except the modifying agent described above, and a coupling agent into the polymer system, in addition to modifying the conjugated diene-based polymer chain having an active terminal with the modifying agent described above. That is, in the particular conjugated diene rubber, a part of the active terminal of the conjugated diene-based polymer chain may be inactivated by a polymerization terminator, a polymerization terminal modifying agent except the modifying agent described above, a coupling agent, or the like in the range that does not inhibit the effect of the present technology.

Examples of the polymerization terminal modifying agent and coupling agent used in this case include N-substituted cyclic amides, such as N-methyl-2-pyrrolidone, N-vinyl-2-pyrrolidone, N-phenyl-2-pyrrolidone, and N-methyl-ε-caprolactam; N-substituted cyclic ureas, such as 1,3-dimethylethylene urea and 1,3-diethyl-2-imidazolidinone; N-substituted aminoketones, such as 4,4'-bis(dimethylamino)benzophenone and 4,4'-bis(diethylamino)benzophenone; aromatic isocyanates, such as diphenylmethane diisocyanate and 2,4-tolylene diisocyanate; N,N-di-substituted aminoalkylmethacrylamides, such as N,N-dimethylaminopropylmethacrylamide; N-substituted aminoaldehydes, such as 4-N,N-dimethylaminobenzaldehyde; N-substituted carbodiimides, such as dicyclohexylcarbodiimide; Schiff bases, such as N-ethylethylidene imine and N-methylbenzylidene imine; pyridyl group-containing vinyl compounds, such as 4-vinylpyridine; tin tetrachloride; halogenated silicon compounds, such as silicon tetrachloride, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl) hexane; and the like. Excellent steering stability is achieved with a tire obtained by using a highly branched conjugated diene rubber obtained by combined use of a halogenated silicon compound having five or more silicon-halogen atom bonds in each molecule as a coupling agent. These polymerization terminal modifying agents and coupling agents may be used alone, or a combination of two or more types thereof may be used in combination.

When the modifying agent or the like described above is reacted with the active terminal of the conjugated diene-based polymer chain, it is preferable to add the modifying agent or the like in a solution containing the conjugated diene-based polymer chain having an active terminal, and from the perspective of suitably controlling the reaction, it is more preferable to add the modifying agent or the like into a polymerization system by dissolving the modifying agent or the like in an inert solvent. The solution concentration is preferably from 1 to 50 mass %.

The timing of adding the modifying agent or the like is not particularly limited. However, it is desirable to add the modifying agent or the like to this solution in a state where the polymerization reaction in the conjugated diene-based polymer chain having an active terminal has not been completed and the solution containing the conjugated diene-based polymer chain having an active terminal contains a monomer. More specifically, the modifying agent or the like is preferably added to the solution in a state where the solution containing the conjugated diene-based polymer chain having an active terminal contains preferably 100 ppm or greater, and more preferably from 300 to 50000 ppm, of monomer. By adding the modifying agent or the like in such a manner, it is possible to control the reaction well by suppressing side reactions between the conjugated diene-based polymer chain having an active terminal and impurities contained in the polymerization system.

As the conditions for reacting the modifying agent or the like described above with the active terminal of the conjugated diene-based polymer chain, for example, the temperature is in a range from 0 to 100° C., and preferably in a range from 30 to 90° C., and the reaction time of each is in a range from 1 minute to 120 minutes, and preferably in a range from 2 minutes to 60 minutes.

After the modifying agent or the like is reacted with the active terminal of the conjugated diene-based polymer chain, the unreacted active terminal is preferably deactivated by adding a polymerization terminator, for example, an alcohol, such as methanol or isopropanol, or water.

After the active terminal of the conjugated diene-based polymer chain is deactivated, anti-aging agents such as phenol-based stabilizers, phosphorus-based stabilizers, or sulfur-based stabilizers, crumbling agents, antiscale agents, and the like are added as desired to the polymer solution. Thereafter, the polymerization solvent is separated from the polymerization solution by direct drying, steam stripping, or the like, to recover the resulting particular conjugated diene rubber. Furthermore, before separation of the polymerization solvent from the polymerization solution, extender oil may be mixed to the polymerization solution to recover the particular conjugated diene rubber as an oil-extended rubber.

Examples of the extender oil used when the particular conjugated diene rubber is recovered as an oil-extended rubber include paraffin-based, aromatic, and naphthene-based petroleum-based softeners, plant-based softeners, and fatty acids. When the petroleum-based softener is used, the content of the polycyclic aromatics extracted by the method of IP346 (determination method of the Institute of Petroleum in the UK) is preferably less than 3%. When an extender oil is used, the used amount is, for example, from 5 to 100 parts by mass, preferably from 10 to 60 parts by mass, and more preferably from 20 to 50 parts by mass, per 100 parts by mass of the conjugated diene rubber.

The particular conjugated diene rubber preferably contains from 5 to 40 mass %, more preferably from 5 to 30 mass %, and particularly preferably from 10 to 20 mass %, of the structural unit to which three or more conjugated diene-based polymer chains are bonded and which is formed by reacting the conjugated diene-based polymer chain having an active terminal and the polyorganosiloxane described above (hereinafter, "structural unit to which three or more conjugated diene-based polymer chains are bonded and which is formed by reacting the conjugated diene-based polymer chain having an active terminal and the polyorganosiloxane described above" is simply referred to as "structural unit to which three or more conjugated diene-based polymer chains are bonded"). When the proportion of the structural unit to which three or more conjugated diene-based polymer chains are bonded is within the range described above, excellent coagulability and drying properties during production are achieved, and when silica is compounded, a rubber composition for tires having even better processability and a tire having even better low heat build-up can be provided. Note that the proportion of the structural unit to which three or more conjugated diene-based polymer chains are bonded relative to the total amount of the particular conjugated diene rubber that is obtained in the end (mass fraction) is represented as a coupling ratio of three or more branches of the conjugated diene-based polymer chain. This can be measured by gel permeation chromatography (based on calibration with polystyrene). From the chart obtained by gel permeation chromatography measurement, the ratio of the area of the peak portion having a peak top molecular weight equal to or greater than 2.8 times the peak top molecular weight indicated by the peak of smallest molecular weight to the total elution area is taken as the coupling ratio of three or more branches of the conjugated diene-based polymer chain.

The aromatic vinyl unit content of the particular conjugated diene rubber is from 38 to 48 mass %. In particular, the content is preferably from 40 to 45 mass %. When the aromatic vinyl unit content is less than 38 mass %, wet performance becomes insufficient. Furthermore, when the aromatic vinyl unit content is greater than 48 mass %, low rolling resistance is deteriorated.

The vinyl bond content of the particular conjugated diene rubber is from 20 to 35 mass %. In particular, the content is preferably from 25 to 30 mass %. When the vinyl bond content is less than 20 mass %, low rolling resistance is deteriorated. Furthermore, when the vinyl bond content is greater than 35 mass %, the viscosity is increased and processability is deteriorated. Note that "vinyl bond content" indicates the proportion (mass %) of the vinyl bonds in the conjugated diene unit contained in the particular conjugated diene rubber.

The weight average molecular weight (Mw) of particular conjugated diene rubber measured by gel permeation chromatography (GPC) based on calibration with polystyrene is from 500000 to 800000. In particular, the weight average molecular weight (Mw) is preferably from 600000 to 700000. When the weight average molecular weight is less than 500000, wear performance is deteriorated. Furthermore, when the weight average molecular weight is greater than 800000, processability is deteriorated.

The molecular weight distribution expressed as the ratio (Mw/Mn) of the weight average molecular weight (Mw) to the number average molecular weight (Mn) of the particular conjugated diene rubber is preferably from 1.1 to 3.0, more preferably from 1.2 to 2.5, and particularly preferably from 1.2 to 2.2. Note that both Mw and Mn are values measured by GPC based on calibration with polystyrene.

The Mooney viscosity ($ML_{1+4}$, 100° C.) of the particular conjugated diene rubber is preferably from 20 to 100, more preferably from 30 to 90, and particularly preferably from 35 to 80. Note that, when the particular conjugated diene rubber is obtained as an oil-extended rubber, the Mooney viscosity of the oil-extended rubber is preferably within the range described above.

In the present technology, the content of the particular conjugated diene rubber in the diene rubber is 30 mass % or greater, preferably from 40 to 80 mass %, and more preferably from 50 to 70 mass %.

When the content of the particular conjugated diene rubber in the diene rubber is less than 30 mass %, wet performance, low rolling resistance, and steering stability become insufficient.

Note that "content of the particular conjugated diene rubber in the diene rubber" indicates the content (mass %) of the particular conjugated diene rubber relative to the total amount of the diene rubber.

Other Rubber Component

The diene rubber described above may contain another rubber component (other rubber component) besides the modified conjugated diene rubber described above. Such a rubber component is not particularly limited; however, examples thereof include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), halogenated butyl rubber (Br—IIR, Cl—IIR), and chloroprene rubber (CR). Note that examples of the aromatic vinyl-conjugated diene copolymer rubber described above include styrene-butadiene rubber (SBR), and styrene-isoprene copolymer rubber.

Among these other rubber components, use of BR or SBR is preferred, and use of BR is more preferred.

In the present technology, the average glass transition temperature (Tg) of such a diene rubber is from −45 to −20° C., and preferably from −40 to −25° C. Note that the average Tg of the diene rubber is calculated by multiplying the Tg of component of each rubber by the number of mass % of each rubber component, and then summing up the obtained values. Furthermore, Tg of each rubber is calculated by the midpoint method based on the measurement using a differential scanning calorimetry (DSC) at a rate of temperature increase of 20° C./min.

Silica

The silica contained in the rubber composition of the present technology is not particularly limited, and any conventionally known silica that is compounded into a rubber composition in applications such as tires can be used.

Specific examples of the silica include fumed silica, calcined silica, precipitated silica, pulverized silica, molten silica, and colloidal silica. One type of these may be used alone, or two or more types may be used in combination.

In the present technology, from the perspective of achieving even better wet performance, the CTAB adsorption specific surface area is preferably 180 m$^2$/g or greater, and more preferably from 185 to 215 m$^2$/g.

Note that the CTAB adsorption specific surface area is a value of the amount of n-hexadecyltrimethylammonium bromide adsorbed to the surface of silica measured in accordance with JIS (Japanese Industrial Standard) K6217-3:2001 "Part 3: Method for determining specific surface area—CTAB adsorption method."

Furthermore, in the present technology, from the perspectives of achieving even better low rolling resistance and achieving both the wet performance and the wear resistance, in the silica, a silica (X) having a CTAB adsorption specific surface area of 144 to 176 m$^2$/g and a silica (Y) having a CTAB adsorption specific surface area of 180 to 220 m$^2$/g are used in combination, and the mass ratio (X:Y) of the silica (X) to the silica (Y) is preferably from 4:1 to 1:3.

In the rubber composition of the present technology, the content of the silica (when the silica (X) and the silica (Y) described above are used in combination, the total amount of these) is from 60 to 180 parts by mass, preferably from 80 to 120 parts by mass, and more preferably from 90 to 110 parts by mass, per 100 parts by mass of the diene rubber described above.

Silane Coupling Agent

The silane coupling agent contained in the rubber composition of the present technology is not particularly limited, and any conventionally known silane coupling agent that is blended in rubber compositions for applications such as tires can be used.

Specific examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, dimethoxymethylsilylpropyl-N,N-dimethylthiocarbamoyl tetrasulfide, and dimethoxymethylsilylpropyl benzothiazole tetrasulfide. One type of these may be used alone, or two or more types may be used in combination. In addition, one or two or more types of these may be oligomerized in advanced and used.

Furthermore, specific examples of the silane coupling agent except those listed above include mercapto-based silane coupling agents, such as γ-mercaptopropyltriethoxysilane and 3-[ethoxybis(3,6,9,12,15-pentaoxaoctacosan-1-yloxy)silyl]-1-propanethiol; thiocarboxylate-based silane coupling agents, such as 3-octanoylthiopropyltriethoxysilane; and thiocyanate-based silane coupling agents, such as 3-thiocyanatepropyltriethoxysilane. One type of these may be used alone, or two or more types may be used in combination. In addition, one or two or more types of these may be oligomerized in advanced and used.

Among these, from the perspective of effect of enhancing reinforcing properties, bis(3-triethoxysilylpropyl)tetrasulfide and/or bis(3-triethoxysilylpropyl)disulfide is preferably used. Specific examples thereof include Si69 (bis(3-triethoxysilylpropyl)tetrasulfide, manufactured by Evonik Degussa), and Si75 (bis(3-triethoxysilylpropyl)disulfide, manufactured by Evonik Degussa).

In the present technology, the content of the silane coupling agent is preferably from 4 to 20 mass %, and more preferably from 6 to 15 mass %, relative to the content of the silica described above.

Fatty Acid Metal Salt

The fatty acid metal salt contained in the rubber composition of the present technology is not particularly limited, and any conventionally known fatty acid metal salt that is blended in rubber compositions for applications such as tires can be used. A fatty acid zinc salt specifically exemplified below is preferably used.

Specific examples of the fatty acid zinc salt which is a preferred example of the fatty acid metal salt include zinc stearate, zinc oleate, zinc palmitate, zinc myristate, zinc laurate, and zinc linoleate. One type of these may be used alone, or two or more types may be used in combination.

In the present technology, the content of the fatty acid metal salt is from 2 to 8 mass %, and more preferably from 4 to 6 mass %, relative to the content of the silica described above.

Alkyltrialkoxysilane

The alkyltrialkoxysilane contained in the rubber composition of the present technology is an alkyltrialkoxysilane represented by Formula (I) below.

In Formula (I), $R^{11}$ represents an alkyl group having from 1 to 20 carbons, and $R^{12}$ each independently represents a methyl group or an ethyl group.

Note that specific examples of the alkyl group having from 1 to 20 carbons of $R^{11}$ include a methyl group, an ethyl group, a propyl group, a butyl group, a pentyl group, a hexyl group, a heptyl group, an octyl group, a nonyl group, a decyl group, an undecyl group, and a dodecyl group.

Among these, from the perspective of miscibility with the rubber component described above, the number of carbons of $R^{11}$ is preferably 7 or greater, and specifically, an octyl group and a nonyl group are more preferred.

In the rubber composition of the present technology, the content of the alkyltrialkoxysilane is from 0.1 to 20 mass %, and preferably from 1 to 5 mass %, relative to the content of the silica described above.

Optional Components

The rubber composition of the present technology may further contain another component (optional component) as necessary within the scope that does not inhibit the effect or purpose thereof.

Examples of the optional component include various additives, such as fillers except silica, aromatic modified terpene resins, zinc oxide (zinc white), stearic acid, anti-aging agents, waxes, oils, liquid polymers, thermosetting resins, vulcanizing agents (e.g. sulfur), and vulcanization accelerators.

Among these, the aromatic modified terpene resin described below are preferably contained.

Aromatic Modified Terpene Resin

The rubber composition of the present technology preferably further contains an aromatic modified terpene resin from the perspective of achieving even better wet performance.

The softening point of the aromatic modified terpene resin is not particularly limited; however, the softening point is preferably from 100 to 150° C., and more preferably from 100 to 130° C.

Note that the softening point is a Vicat softening point measured in accordance with JIS K7206:1999.

In the rubber composition of the present technology, in the case where the aromatic modified terpene resin is contained, the content thereof is not particularly limited; however, the content is preferably from 1 to 50 parts by mass, and more preferably from 5 to 30 parts by mass, per 100 parts by mass of the diene rubber described above.

Method of Preparing Rubber Composition for Tires

The method of producing the rubber composition of the present technology is not particularly limited, and specific examples thereof include a method whereby each of the above-mentioned components is kneaded using a publicly known method and device (e.g. Banbury mixer, kneader, and roller). When the rubber composition of the present technology contains sulfur or a vulcanization accelerator, it is preferable to blend the components other than the sulfur and the vulcanization accelerator first at a high temperature (preferably from 100° C. to 160° C.), cool the mixture, and then blend the sulfur and the vulcanization accelerator thereto.

In addition, the rubber composition of the present technology can be vulcanized or crosslinked under conventional, publicly known vulcanizing or crosslinking conditions.

Pneumatic Tire

The pneumatic tire of the present technology is a pneumatic tire produced by using the rubber composition of the present technology described above. In particular, the pneumatic tire is preferably a pneumatic tire that includes the rubber composition of the present technology in the cap tread.

Figure 1:
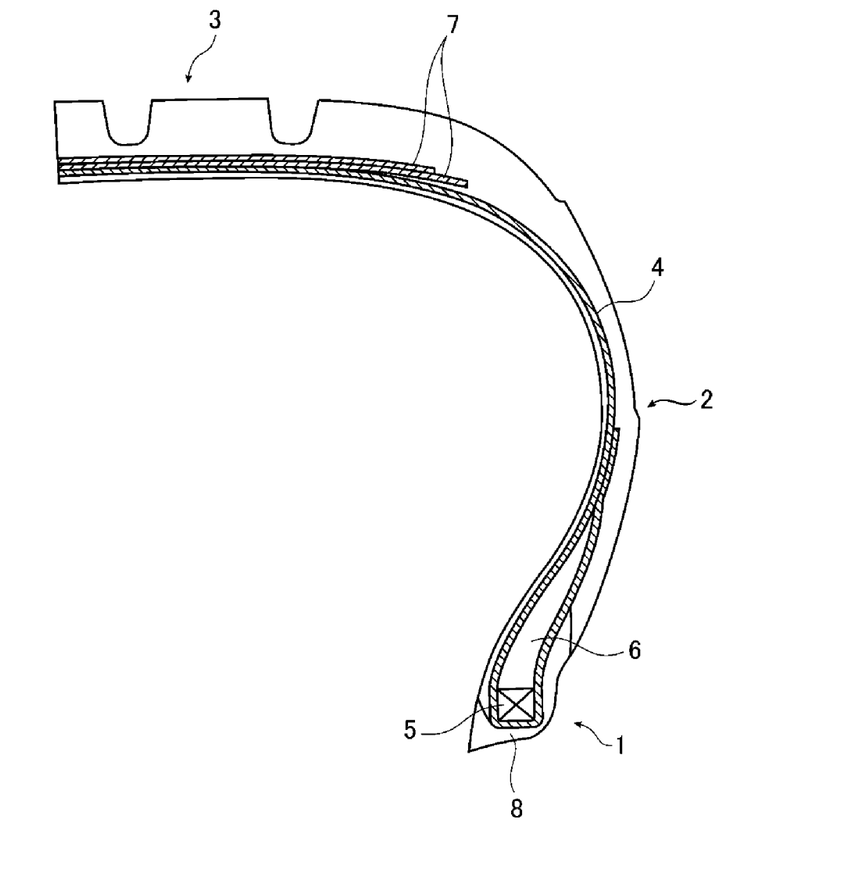
FIG. 1 is a partial cross-sectional schematic view of a tire that illustrates one embodiment of a pneumatic tire of the present technology.

FIG. 1 is a partial cross-sectional schematic view of a tire that represents one embodiment of the pneumatic tire of the present technology, but the pneumatic tire of the present technology is not limited to the embodiment illustrated in FIG. 1.

In FIG. 1, reference sign 1 indicates a bead portion, reference sign 2 indicates a sidewall portion, and reference sign 3 indicates a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

Note that the tire tread portion 3 is formed by the rubber composition of the present technology described above.

The pneumatic tire of the present technology can be produced, for example, in accordance with a conventionally known method. In addition to ordinary air or air with an adjusted oxygen partial pressure, inert gases such as nitrogen, argon, and helium can be used as the gas with which the tire is filled.

Examples

Hereinafter, the present technology will be further described in detail with reference to examples; however, the present technology is not limited thereto.

Preparation of Modified Conjugated Diene Rubber

Preparation of Modified Conjugated Diene Rubber 1 (Particular Conjugated Diene Rubber)

In a nitrogen-purged 100 mL ampoule bottle, cyclohexane (35 g) and tetramethylethylenediamine (1.4 mmol) were added, and then n-butyllithium (4.3 mmol) was added. Thereafter, isoprene (21.6 g) and styrene (3.1 g) were gradually added and reacted in the ampoule bottle at 50° C. for 120 minutes to obtain a polymer block A having an active terminal. For this polymer block A, the weight average molecular weight, molecular weight distribution, aromatic vinyl unit content, isoprene unit content, and 1,4-bond content were measured. These measurement results are shown in Table 1.

Thereafter, in an autoclave equipped with a stirrer, cyclohexane (4000 g), 1,3-butadiene (474.0 g), and styrene (126.0 g) were charged in a nitrogen atmosphere, and then the total amount of the polymer block A having an active terminal obtained as described above was added to initiate polymerization at 50° C. After checking that the polymer conversion rate was in a range from 95% to 100%, the polyorganosiloxane A represented by Formula (4) below was added in a state of a xylene solution with a concentration of 20 mass % in a manner that the content of the epoxy group was 1.42 mmol (equivalent to 0.33 times the number of moles of the used n-butyllithium), and reacted for 30 minutes. After that, methanol in an amount equivalent to twice the number of moles of the used n-butyllithium was added as a polymerization terminator, and a solution containing a particular conjugated diene rubber was obtained. To this solution, a small amount of anti-aging agent (IRGANOX 1520, manufactured by BASF) and, as an extension oil, 25 parts by mass of Fukkoru Eramikku 30 (manufactured by Nippon Oil Corporation) per 100 parts by mass of the particular conjugated diene rubber were added. Then, a solid rubber was recovered using a steam stripping process. By dehydrating the obtained solid rubber using a roll and drying it in a dryer, a solid particular conjugated diene rubber was obtained.

Formula (4)

In Formula (4) above, each of $X_1$, $X_4$, $R_1$ to $R_3$, and $R_5$ to $R_8$ is a methyl group. In Formula (4) above, m is 80, and k is 120. In Formula (4) above, $X_2$ is a group represented by Formula (5) below (in the formula, * indicates a bond position).

Formula (5)

For the obtained particular conjugated diene rubber, the weight average molecular weight, molecular weight distribution, coupling ratio of three or more branches, aromatic vinyl unit content, vinyl bond content, and Mooney viscosity were measured. The measurement results are shown in Table 2. The measurement methods are as follows.

Weight Average Molecular Weight, Molecular Weight Distribution, and Coupling Ratio of Three or More Branches The weight average molecular weight, molecular weight distribution, and coupling ratio of three or more branches (proportion (mass %) of "structural unit to which three or more conjugated diene-based polymer chains are bonded" relative to the amount of the particular conjugated diene rubber) were determined using a chart obtained by gel permeation chromatography based on molecular weight based on calibration with polystyrene. The specific gel permeation chromatography measurement method is as follows.

Measurement instrument: HLC-8020 (manufactured by Tosoh Corp.)

Column: GMH-HR-H (manufactured by Tosoh Corp.), two connected in series

Detector: Differential refractometer RI-8020 (manufactured by Tosoh Corp.)

Eluent: Tetrahydrofuran

Column temperature: 40° C.

Here, the coupling ratio of three or more branches is the ratio (s2/s1) of the area (s2) of the peak portion having a peak top molecular weight equal to or greater than 2.8 times the peak top molecular weight indicated by the peak of smallest molecular weight to the total elution area (s1).

Aromatic Vinyl Unit Content and Vinyl Bond Content

The aromatic vinyl unit content and the vinyl bond content were measured by $^1$H-NMR.

Mooney Viscosity

The Mooney viscosity ($ML_{1+4}$, 100° C.) was measured in accordance with JIS K6300-1:2013.

TABLE 1

|  | Polymer block A |
|---|---|
| Weight average molecular weight | 8700 |
| Molecular weight distribution (Mw/Mn) | 1.10 |
| Aromatic vinyl unit content (mass %) | 12.6 |
| Isoprene unit content (mass %) | 87.4 |
| 1,4-Bond content (mass %) | 58.0 |

TABLE 2

|  | Particular conjugated diene rubber |
|---|---|
| Weight average molecular weight | 640000 |
| Molecular weight distribution (Mw/Mn) | 1.65 |
| Coupling ratio of three or more branches (mass %) | 12.5 |
| Aromatic vinyl unit content (mass %) | 42.6 |
| Vinyl bond content (mass %) | 29.5 |
| Mooney viscosity ($ML_{1+4}$, 100° C.) | 58 |

Production of Modified Conjugated Diene Rubber 2

To a nitrogen-purged autoclave reaction vessel having an internal capacity of 10 L, 4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were charged. Then, agitation was begun. After the temperature of the content in the reaction vessel was adjusted to 50° C., 5.061 mL (7.945 mmol) of n-butyllithium was added. After the polymer conversion rate reached approximately 100%, 12.0 g of isoprene was added and the mixture was reacted for 5 minutes. Then, 0.281 g (0.318 mmol) of a toluene solution containing 40 wt. % of 1,6-bis(trichlorosilyl)hexane was added and the mixture was reacted for 30 minutes. Furthermore, the polyorganosiloxane A represented by Formula (4) above was added in a state of a xylene solution with a concentration of 20 mass % in a manner that the content of the epoxy group was 1.00 mmol (equivalent to 0.13 times the number of moles of the used n-butyllithium), and reacted for 30 minutes. Thereto, 0.5 mL of methanol was added and agitated for 30 minutes to obtain a solution containing conjugated diene rubber. To the obtained solution, a small amount of anti-aging agent (IRGANOX 1520, manufactured by BASF) and, as an extension oil, 25 parts by mass of Fukkoru Eramikku 30 (manufactured by Nippon Oil Corporation) per 100 parts by mass of the conjugated diene rubber were added. Then, a solid rubber was recovered using a steam stripping process. By dehydrating the obtained solid rubber using a roll and drying it in a dryer, a solid conjugated diene rubber was obtained. The obtained conjugated diene rubber was used as a modified conjugated diene rubber 2.

Preparation of Rubber Composition for Tires

The components shown in Table 3 below were blended in the proportions (part by mass) shown in Table 3 below.

Specifically, a master batch was obtained by mixing the components shown in Table 3, excluding the sulfur and the vulcanization accelerator for 5 minutes in a 1.7 L closed-type Banbury mixer heated to a temperature near 150° C., and then discharging the mixture and cooling it to room temperature. The sulfur and vulcanization accelerator were then mixed into the resulting master batch using the Banbury mixer described above so as to obtain a rubber composition for tires.

Note that, in Table 3, the numbers of part by mass of the particular conjugated diene rubber (modified conjugated diene rubber 1) and the modified conjugated diene rubber 2 are net amounts of rubbers excluding the extender oils (unit: part by mass).

Evaluation

The following evaluations were performed for the obtained rubber composition for tires.

Steering Stability

A tire cap tread was formed using the obtained rubber composition for tires, and a test tire having a size of 195/R15, in which the cap tread was incorporated, was produced. Thereafter, four test tires with the same specification were fitted onto a test vehicle with an engine displacement of 2 L, the grip level and the steering characteristics on dried paved road surfaces were evaluated by feeling evaluation, and indicated as an index with the result of Comparative Example 1 expressed as an index of 100. A larger index indicates better steering stability.

Wet Performance

A vulcanized rubber sheet was produced by press-vulcanizing the obtained (unvulcanized) rubber composition for tires for 20 minutes at 160° C. in a mold (15 cm×15 cm×0.2 cm).

The value of tan δ (0° C.) was measured for the produced vulcanized rubber sheet with an elongation deformation strain of 10%±2%, a frequency of 20 Hz, and a temperature of 0° C. using a viscoelastic spectrometer (manufactured by Toyo Seiki Seisaku-sho, Ltd.) in accordance with JIS K6394:2007.

The results are shown in Table 3 (row of "wet performance" in Table 3). The result was expressed as an index with the value of tan δ (0° C.) of Comparative Example 1 expressed as an index of 100. A larger index indicates a larger tan δ (0° C.) value, which in turn indicates excellent wet performance when a tire is produced.

Low Rolling Resistance

Except that the measurement was performed at a temperature of 60° C. instead of measuring at a temperature of 0° C., tan δ (60° C.) was measured in accordance with the same procedure for the wet performance described above.

The results are shown in Table 3 (row of "low rolling resistance" in Table 3). The result was expressed as a reciprocal of index, with the value of tan δ (60° C.) of Comparative Example 1 expressed as an index of 100. A larger index indicates a smaller tan δ (60° C.) value, which in turn indicates excellent low rolling resistance when a tire is produced.

TABLE 3

| | Comparative Example | | | | | |
|---|---|---|---|---|---|---|
| | 1 | 2 | 3 | 4 | 5 | 6 |
| Particular conjugated diene rubber | — | 50.00 | 50.00 | 50.00 | 50.00 | 50.00 |
| Modified conjugated diene rubber 2 | 80.00 | 30.00 | 30.00 | 10.00 | 30.00 | 30.00 |
| Butadiene rubber | 20.00 | 20.00 | 20.00 | 40.00 | 20.00 | 20.00 |
| Silica X | 100.00 | 50.00 | 190.00 | 100.00 | 100.00 | 100.00 |
| Silica Y | — | — | — | — | — | — |
| Carbon black | 5.00 | 5.00 | 5.00 | 5.00 | 5.00 | 5.00 |
| Alkyltrialkoxysilane | 5.00 | 5.00 | 5.00 | 5.00 | 5.00 | — |
| Silane coupling agent | 8.00 | 4.00 | 15.20 | 8.00 | 8.00 | 8.00 |
| Fatty acid metal salt | 3.00 | 3.00 | 3.00 | 3.00 | — | 3.00 |
| Oil | 30.00 | 0.00 | 100.00 | 35.00 | 30.00 | 30.00 |
| Zinc oxide | 3.00 | 3.00 | 3.00 | 3.00 | 3.00 | 3.00 |
| Sulfur | 1.00 | 1.00 | 1.00 | 1.00 | 1.00 | 1.00 |
| Vulcanization accelerator | 2.00 | 2.00 | 2.00 | 2.00 | 2.00 | 2.00 |
| Aromatic modified terpene resin | — | — | — | — | — | — |
| Steering stability | 100 | 102 | 105 | 95 | 103 | 100 |
| Wet performance | 100 | 85 | 130 | 80 | 99 | 98 |
| Low rolling resistance | 100 | 117 | 74 | 105 | 95 | 95 |
| Average glass transition temperature of diene rubber (° C.) | −40 | −40 | −40 | −53 | −40 | −40 |

| | Example | | | |
|---|---|---|---|---|
| | 1 | 2 | 3 | 4 |
| Particular conjugated diene rubber | 50.00 | 50.00 | 50.00 | 50.00 |
| Modified conjugated diene rubber 2 | 30.00 | 30.00 | 30.00 | 30.00 |
| Butadiene rubber | 20.00 | 20.00 | 20.00 | 20.00 |
| Silica X | 100.00 | 100.00 | — | 70.00 |
| Silica Y | — | — | 100.00 | 30.00 |
| Carbon black | 5.00 | 5.00 | 5.00 | 5.00 |
| Alkyltrialkoxysilane | 5.00 | 5.00 | 5.00 | 5.00 |
| Silane coupling agent | 8.00 | 8.00 | 8.00 | 8.00 |
| Fatty acid metal salt | 3.00 | 3.00 | 3.00 | 3.00 |
| Oil | 30.00 | 25.00 | 15.00 | 15.00 |
| Zinc oxide | 3.00 | 3.00 | 3.00 | 3.00 |
| Sulfur | 1.00 | 1.00 | 1.00 | 1.00 |
| Vulcanization accelerator | 2.00 | 2.00 | 2.00 | 2.00 |
| Aromatic modified terpene resin | — | 10.00 | 10.00 | 10.00 |
| Steering stability | 106 | 104 | 105 | 105 |
| Wet performance | 102 | 107 | 125 | 120 |

TABLE 3-continued

| Low rolling resistance | 108 | 110 | 103 | 108 |
|---|---|---|---|---|
| Average glass transition temperature of diene rubber (° C.) | −40 | 39 | 39 | −40 |

In Table 3, details of the components are as follows.

Particular conjugated diene rubber (modified conjugated diene rubber 1): Particular conjugated diene rubber produced as described above (containing 25 parts by mass of extender oil per 100 parts by mass of the rubber)

Modified conjugated diene rubber 2: Modified conjugated diene rubber 2 produced as described above (containing 25 parts by mass of extender oil per 100 parts by mass of the rubber) (aromatic vinyl unit content: 42 mass %; vinyl bond content: 32 mass %; Tg: −25° C.; Mw: 750000 (measurement methods were as described above))

Butadiene rubber: Nipol BR 1220 (manufactured by Zeon Corporation)

Silica X: Zeosil 1165MP (CTAB adsorption specific surface area: 159 m$^2$/g, manufactured by Solvay)

Silica Y: Ultrasil 9000GR (CTAB adsorption specific surface area: 197 m$^2$/g, manufactured by Evonik)

Carbon black: SEAST KHP (manufactured by Tokai Carbon Co., Ltd.)

Alkyltrialkoxysilane: Octyltriethoxysilane (KBE-3083, manufactured by Shin-Etsu Chemical Co., Ltd.)

Silane coupling agent: Si69, manufactured by Evonik Degussa

Fatty acid metal salt: HT207 (manufactured by Struktol)

Oil: Extract No. 4S (manufactured by Showa Shell Sekiyu K.K.)

Zinc oxide: Zinc Oxide #3 (manufactured by Seido Chemical Industry Co., Ltd.)

Sulfur: Golden Flower oil treated sulfur powder (content of sulfur: 95.24 mass %; manufactured by Tsurumi Chemical Industry Co., Ltd.)

Vulcanization accelerator: SANTOCURE CBS (manufactured by FLEXSYS)

Aromatic modified terpene resin: YS RESIN TO-125 (softening point: 125±5° C.; manufactured by Yasuhara Chemical Co., Ltd.)

As is clear from Table 3, it was found that, although the rubber compositions of Comparative Examples 2 and 3, in which the compounded amount of the silica was outside of the predetermined range, exhibited better steering stability than that of the rubber composition of Comparative Example 1, the wet performance and the low rolling resistance were inferior.

Furthermore, it was found that the rubber composition of Comparative Example 4, in which the glass transition temperature was lower than −45° C., exhibited inferior steering stability and wet performance than those of the rubber composition of Comparative Example 1.

Furthermore, it was found that, although the rubber composition of Comparative Example 5, which was prepared by compounding no fatty acid metal salt, exhibited better steering stability than that of the rubber composition of Comparative Example 1, the low rolling resistance was inferior.

Furthermore, it was found that the rubber composition of Comparative Example 6, which was prepared by compounding no alkyltrialkoxysilane, exhibited inferior low rolling resistance compared to that of the rubber composition of Comparative Example 1.

On the other hand, the rubber compositions of Examples 1 to 4, which contained the diene rubber containing 60 mass % or greater of the modified conjugated diene rubber and 30 mass % or greater of the particular conjugated diene rubber, as well as the predetermined amounts of the silica, the silane coupling agent, the fatty acid metal salt, and the alkyltrialkoxysilane, all exhibited excellent wet performance, low rolling resistance, and steering stability.

Furthermore, from the comparison of Examples 1 and 2, it was found that the wet performance was further enhanced when the aromatic modified terpene resin having a softening point of 100 to 150° C. was compounded.

Furthermore, from the comparison of Examples 2 and 3, it was found that the wet performance was further enhanced when the silica having a CTAB adsorption specific surface area of 180 m$^2$/g or greater was compounded.

Furthermore, from the comparison of Examples 2 to 4, it was found that Example 4, in which the silica (X) having a CTAB adsorption specific surface area of 144 to 176 m$^2$/g and the silica (Y) having a CTAB adsorption specific surface area of 180 to 220 m$^2$/g were used in combination and the mass ratio (X:Y) of the silica (X) to the silica (Y) was from 4:1 to 1:3, achieved excellent balance between the low rolling resistance and the wet performance.

The invention claimed is:

1. A rubber composition for tires comprising a diene rubber, silica, a silane coupling agent, a fatty acid metal salt, and an alkyltrialkoxysilane represented by Formula (I);

the diene rubber containing 60 mass % or greater of a modified conjugated diene rubber and 30 mass % or greater of a particular conjugated diene rubber which corresponds to a part or all of the modified conjugated diene rubber;

an average glass transition temperature of the diene rubber being from −45 to −20° C.;

a content of the silica being from 60 to 180 parts by mass per 100 parts by mass of the diene rubber;

a content of the silane coupling agent being from 4 to 20 parts by mass relative to the content of the silica;

a content of the fatty acid metal salt being from 2 to 8 mass % relative to the content of the silica;

a content of the alkyltrialkoxysilane being from 0.1 to 20 mass % relative to the content of the silica;

wherein, in the silica, a silica (X) having a CTAB adsorption specific surface area of 144 to 176 m$^2$/g and a silica (Y) having a CTAB adsorption specific surface area of 180 to 220 m$^2$/g are used in combination, and a mass ratio (X:Y) of the silica (X) to the silica (Y) is from 4:1 to 1:3, wherein, $R^{11}$ represents an alkyl group having from 1 to 20 carbons, and $R^{12}$ each independently represents a methyl group or an ethyl group;

the particular conjugated diene rubber being a conjugated diene rubber produced by a method of producing a conjugated diene rubber, the method comprising steps A, B, and C below in this order;

the particular conjugated diene rubber having an aromatic vinyl unit content of 38 to 48 mass %, a vinyl bond content of 20 to 35 mass %, and a weight average molecular weight of 500000 to 800000;

Step A: a step of forming a polymer block A having an active terminal, the polymer block A having an isoprene unit content of 80 to 95 mass %, an aromatic vinyl unit content of 5 to 20 mass %, and a weight average molecular weight of 500 to 15000, by polymerizing a monomer mixture containing isoprene and an aromatic vinyl;

Step B: a step of obtaining a conjugated diene-based polymer chain having an active terminal, the conjugated diene-based polymer chain having the polymer block A and a polymer block B, by forming the polymer block B having an active terminal by mixing the polymer block A with a monomer mixture containing 1,3-butadiene and an aromatic vinyl to continue polymerization reaction to form the polymer block B in series with the polymer block A; and Step C: a step of reacting a polyorganosiloxane represented by Formula (1) with the active terminal of the conjugated diene-based polymer chain;

Formula (1)

wherein, $R_1$ to $R_8$ are the same or different and are each an alkyl group having from 1 to 6 carbons or an aryl group having from 6 to 12 carbons; $X_1$ and $X_4$ are the same or different and are groups selected from the group consisting of alkyl groups having from 1 to 6 carbons, aryl groups having from 6 to 12 carbons, alkoxy groups having from 1 to 5 carbons, and groups having an epoxy group and from 4 to 12 carbons; $X_2$ is an alkoxy group having from 1 to 5 carbons or a group having an epoxy group and from 4 to 12 carbons, and a plurality of the $X_2$ moieties are the same or different; $X_3$ is a group having from 2 to 20 alkylene glycol repeating units, and when a plurality of the $X_3$ moieties exists, the $X_3$ moieties are the same or different; and m is an integer of 3 to 200, n is an integer of 0 to 200, and k is an integer of 0 to 200.

2. The rubber composition for tires according to claim 1, further comprising an aromatic modified terpene resin having a softening point of 100 to 150° C.,
a content of the aromatic modified terpene resin being from 1 to 50 parts by mass per 100 parts by mass of the diene rubber.

3. The rubber composition for tires according to claim 2, wherein a CTAB adsorption specific surface area of the silica is 180 $m^2/g$ or greater.

4. The rubber composition for tires according to claim 1, wherein a CTAB adsorption specific surface area of the silica is 180 $m^2/g$ or greater.

5. A pneumatic tire having the rubber composition for tires described in claim 4 in a cap tread.

6. A pneumatic tire having the rubber composition for tires described in claim 3 in a cap tread.

7. A pneumatic tire having the rubber composition for tires described in claim 2 in a cap tread.

8. A pneumatic tire having the rubber composition for tires described in claim 1 in a cap tread.

* * * * *